Patented May 5, 1942

2,282,187

UNITED STATES PATENT OFFICE 2,282,187

PROCESS OF PASTEURIZING LIQUIDS IN CONTAINERS

James L. Herold and William J. Nekola, St. Louis, and Frederick W. Wehmiller, Ladue, Mo., assignors to Barry-Wehmiller Machinery Company, St. Louis, Mo., a corporation of Missouri Application August 11, 1939, Serial No. 289,512

9 Claims. (Cl. 99—249)

This invention relates to processes of pasteurizing liquids in containers and more particularly to a process wherein the containers of liquid are subjected to successive sprays of liquid to preheat, pasteurize and cool the same.

On of the objects of this invention is to provide a process of spraying, preheating, pasteurizing and cooling liquids onto the containers to obtain a very efficient and effective heat transfer with a relatively small quantity of said liquids.

Another object of this invention is to provide a pasteurizing process wherein the various heating and cooling liquids are sprayed onto the containers in such a manner as to obtain a very effective distribution of liquid thereon.

A further object is to provide for a gradual temperature change in the containers as they pass from one temperature zone to another A still further object is to provide a very economical process of pasteurizing various products with sprays of liquids at different temperatures, wherein the sprayed liquids are very efficiently reused to produce the desired temperatures in the products being treated.

With the foregoing and other objects in view, the invention comprises the novel process hereinafter more specifically described and shown in the accompanying drawing, which illustrates one form of the invention. However, it is to be understood that the invention comprehends changes, variations and modifications within the scope of the claims hereunto appended.

Fig. 1 is a longitudinal section diagrammatically illustrating a pasteurizing system embodying the features of this invention.

Fig. 2 is a diagrammatical side view of the system shown in Fig. 1.

Fig. 3 is a fragmentary top view of a conveyor for transmitting articles through the pasteurizer.

As an illustration of a suitable pasteurizing apparatus for carrying out our invention, we have shown an elongated housing 5 provided with an entrance 6 and an outlet 7 at opposite ends of the housing. Any suitable feeding means may be employed to transmit bottles 8 or equivalent containers containing liquid to be pasteurized from the entrance 6 to the outlet 7. As an illustration of a suitable feeding means, we have shown an endless conveyor 9 which travels around pulleys 10 at opposite ends of the machine. As shown in Fig. 3 the conveyor may be perforated to permit the passage of liquid through it. It is understood that any suitable power mechanism may be employed to drive the conveyor 9.

As the bottles slowly progress from the entrance 6 to the outlet 7 they are successively subjected to sprays of liquid at preheating, pasteurizing, and cooling temperatures.

The relatively cool bottles entering the housing may be first subjected to sprays of liquid at a preheating temperature, such as 120° F., to preheat the bottles before they are subjected to the relatively hot pasteurizing liquid.

A body of preheating liquid is preferably maintained in a compartment 11 at the lower portion of the housing 5. Liquid from this compartment 11 is forced by a motor driven pump 12 through a duct 13 to a series of headers 14 and 15 provided with a plurality of branch pipes having nozzles 17 and 18 at their ends for projecting fluid under pressure in the form of flaring sprays onto the bottles.

The nozzles 17 supplied with liquid from the header 14 are preferably located above a compartment 19 so that a portion of the preheating liquid sprayed onto the bottles will fall by gravity into said compartment 19 to form a body of precooling liquid.

The nozzles 18 supplied with liquid from the headers 15 are located above the preheating compartment 11 so that most of the preheating liquid sprayed onto the bottles by the nozzles 18 is returned by gravity to the preheating compartment for reuse in preheating the incoming bottles.

After the bottles have been subjected to sprays of preheating liquid, they pass through sprays of liquid at a pasteurizing temperature which brings the bottles and their contents to a pasteurizing temperature and maintains said temperature to provide the desired pasteurizing action.

A body of pasteurizing liquid is preferably maintained in a compartment 20 at the lower portion of the housing 5 adjacent to the preheating compartment 11. The liquid in the compartment 20 is preferably maintained at a pasteurizing temperature, such as 140° F., by means of a steam pipe 21 through which live steam from any suitable source of supply is introduced into the pasteurizing liquid in the compartment 20.

Liquid from the compartment 20 is forced under pressure by a motor driven pump 22 through a supply pipe 23 to branch conductors 24, 25 and 26. The conductor 24 is connected to a manifold duct 27 which supplies liquid to headers 28 and 29 provided with a plurality of branch pipes having nozzles 30 and 31 at their ends for projecting fluid under pressures in the form of flaring sprays onto the bottles.

The branch conductor 25 connects the supply pipe 23 to a manifold duct 32 which supplies liquid to headers 33 provided with a plurality of branch pipes having nozzles 34 for projecting fluid onto the bottles. Ordinarily by the time the bottles reach the liquid sprays discharged from the nozzles 34, the bottles and their contents will be at a pasteurizing temperature. However, under certain conditions, such as when relatively large bottles of liquid are being transmitted through the pasteurizer, we have found it advisable to increase the temperature of the liquid discharged from the nozzles 34. The temperature of the liquid supplied to the nozzles 34 may be increased, for example to 145° F., by introducing live steam through a steam pipe 35 into the liquid passing through the manifold duct 32.

The branch conductor 26 extends from the supply pipe 23 to a header 36 provided with a plurality of branch pipes having nozzles 37 for projecting fluid onto the bottles. The fluid projected from the nozzles 37 serves to maintain the bottles and their contents at a pasteurizing temperature.

As shown in Fig. 1, the nozzles 30 for spraying pasteurizing fluid on the bottles passing from the preheating sprays are located above the compartment 11. A portion of the pasteurizing fluid will, therefore, fall by gravity into the compartment 11 where it is mixed with the preheating fluid to increase the temperature thereof. The amount of sprayed pasteurizing liquid introduced into the compartment 11 is approximately equal to the quantity of preheating liquid transmitted to the compartment 19 for the precooling liquid. The pasteurizing liquid entering the preheating compartment 11, therefore, replaces the preheating liquid not directly returned to said preheating compartment.

We have shown a steam pipe 38 for introducing steam into the body of preheating liquid in the compartment 11. Under the preferred operating conditions the sprayed pasteurizing fluid introduced into said compartment 11 is sufficient to provide the desired preheating temperature in the resultant fluid. The steam pipe 38 is usually employed to introduce steam into the liquid in compartment 11 as an initial step, when the system is placed in operation to more quickly bring the body of preheating liquid to the desired temperature. However, if found desirable, steam from pipe 38 may be used to increase the temperature of the preheating liquid during the continued operation of the system.

The nozzles 31, 34 and 37 for spraying pasteurizing fluid onto the bottles are located above the compartment 20 so that a large portion of the sprayed pasteurizing fluid is returned to the body of pasteurizing fluid for reuse.

The bottles passing from the pasteurizing zone are preferably precooled before being subjected to a more intense cooling action. Precooling fluid is, therefore, withdrawn from the compartment 19 through a conductor 39 and forced by a motor driven pump 40 through a pipe 41 to a header 42 provided with branch pipes having nozzles 43 for forcibly spraying the precooling liquid onto the bottles passing from the pasteurizing zone.

The precooling liquid, which may be at a temperature of 105° F., provides an effective cooling action on the bottles and after being sprayed on the bottles and heated thereby it is diverted by a baffle 44 into the body of pasteurizing liquid in the compartment 20. The amount of precooling liquid pumped to nozzles 43 and then introduced into the compartment 20 is approximately equal to the quantity of sprayed pasteurizing liquid transmitted to the body of preheating liquid in the compartment 11. The precooling liquid entering the compartment 20, therefore, replaces the sprayed pasteurizing liquid not directly returned to the compartment 20.

After the bottles are subjected to the precooling sprays, they are preferably sprayed with cooler liquids to cool the bottles leaving the system to the desired temperature.

A body of cooling liquid, which may be at a temperature of 85° F., is maintained in a compartment 45 formed at the lower portion of the housing 5 adjacent to the pasteurizing compartment 20. Liquid from said compartment 45 is forced by a motor driven pump 46 through a conductor 47 and branch conductors 48 to headers 49 having branch pipes provided with nozzles 50 for forcibly spraying the cooling liquid onto the precooled bottles.

As a final treatment, fresh water at a temperature of about 65° F. may be introduced from any suitable source of supply through a conductor 51 to a header 52 provided with a branch pipe having a nozzle 53 for spraying the relatively cool liquid onto the outgoing bottles.

The sprayed liquids discharged from the nozzles 50 and 53 fall by gravity into the compartment 45 where they may be reused to cool the bottles passing from the precooling sprays. The compartment 45 is provided with an overflow pipe 54 to prevent an excessive accumulation of liquid in said compartment.

During the preferred operation of our system, the liquid levels in the compartments 19, 11 and 20 will remain substantially constant as the liquid withdrawn from each compartment is replaced with sprayed liquid, or liquids, in a manner heretofore described. However, to prevent any one of the compartments from accumulating an excess of liquid we have shown an overflow pipe 55 interposed between the compartment 19 and 11, and another overflow pipe 56 interposed between the compartment 11 and 20.

To illustrate our invention, we have shown one form of an apparatus wherein the bottles of liquid to be pasteurized are successively treated with sprays of liquid, such as water, to provide the desired preheating, pasteurizing and cooling operations. However, it will be apparent to those skilled in the art that different forms of apparatus may be employed to carry out our process, and the temperature of the liquids sprayed on the containers may be varied in accordance with nature of the product to be treated and the results desired.

In the preferred form of our process, the liquids which provide the successive preheating, pasteurizing and cooling operations are forcibly discharged under pressure in the form of flaring sprays onto the containers of liquid being treated. We have found that by discharging the liquids under pressure in the form of sprays onto the containers, a very effective and efficient heat transfer is accomplished with a relatively small quantity of liquid in the system. The forcible discharge of the liquids under pressure also tends to prevent clogging of the nozzles. The flaring sprays are discharged at elevations higher than the upper ends of the bottles, so as to provide a clear passage for the mass of bottles.

In comparing our process of forcibly spraying the various liquids under pressure onto the containers with a system wherein the liquids were discharged by gravity, we found that with about one fourth the volume of water circulated in our system, we obtained a more effective heat transfer than in the gravity system. Moreover, the power required for pumping the various liquids was considerably less in our process than in the gravity system where very considerably larger quantities of water had to be elevated to provide for a gravity discharge onto the containers.

As shown in Fig. 1, each of the sprays from the spray adjacent to the entrance to the spray nearest the outlet of pasteurizer, overlaps its adjoining sprays, so that a plurality of sprays are simultaneously projected onto the containers to provide a very effective distribution of liquid thereon. Moreover, by overlapping the sprays of different temperature, the temperature of the bottles is very gradually changed by the combined action of said sprays, thereby eliminating sudden temperature changes which have a tendency to crack or break the bottles.

Each of the flaring sprays shown in Fig. 1 diverges from a vertical axis, and each bottle is moved toward and then away from the axes of successive flaring sprays. Therefore, each bottle is repeatedly subjected to the forcible action of the same flaring spray by discharging said spray onto one side of the bottle as it moves toward the axis of the flaring spray and thereafter projecting the same spray onto the opposite side of the bottle as it moves away from said axis. Furthermore, each of said flaring sprays is forcibly projected onto a plurality of the traveling bottles, while each bottle is subjected to the forcible action of a plurality of the flaring sprays. In this continuous field of forcible flaring sprays the adjacent flaring sprays forcibly intersect and overlap while under the influence of the pump pressure, so as to produce forcible impacts at the intersections. The areas of said forcible intersections and the resultant impacts are distributed throughout the pasteurizing zone to produce and maintain an approximately uniform pasteurizing condition throughout said pasteurizing zone.

This atomized spraying tends to prevent breakage of the bottles, as no large body of hot or cold water is allowed to suddenly strike at any one point, the fine sprays being evenly distributed throughout the continuous field. This distribution of flaring sprays discharged at angles to the bottles, eliminates the inefficiency and loss of water which occurs when the water is allowed to drop vertically between the bottles.

An outstanding function of the atomizing sprays lies in their ability to positively distribute over the bottles exactly the amount of water needed for maximum heat transfer. Intensive research demonstrated that no matter how much this quantity of water is increased, no increase in rate of heat transfer is perceptible. In commercial practice, the amount of water pumped through the circulating system of this pasteurizer is only about one-fourth as much as in other commercial pasteurizers. This results in an astonishingly low pump horsepower consumption.

In addition to the extraordinary efficiency and economy gained in performing the pasteurizing functions, the new system provides for a very high capacity in a relatively small space. The continual stream of traveling bottles may be crowded into contact with each other in the continuous field of overlapping sprays, as shown in Fig. 1, and these bottles will usually appear in the form of an irregular crowded mass, as they are merely pushed onto the horizontal conveyor and it is not necessary to guide them in predetermined paths.

In our process we have obtained a considerable saving in the application of extraneous heating and cooling mediums by efficiently reusing the sprayed liquids to provide the desired temperatures at various places in our system.

The relatively cool containers entering the system tend to progressively cool the preheating liquid sprayed thereon. The coolest portion of the sprayed preheating liquid is employed to effectively precool the containers passing from the pasteurizing zone. The sprayed precooling liquid after being heated by the hot containers is mixed with the body of pasteurizing liquid in the compartment 20 where a relatively small amount of heat is required to bring the heated precooling liquid to a pasteurizing temperature.

The warmest portion of the sprayed preheating liquid is collected in the compartment 11 with a quantity of the sprayed pasteurizing liquid from nozzles 30 to provide the warm preheating liquid therein.

Under ordinary operating conditions, we have found that by the application of a relatively small quantity of heat to the body of pasteurizing liquid, the various desired preheating, pasteurizing, and precooling temperatures in the various liquids are obtained in a very effective manner, with a reduction or elimination of successive extraneous heating and cooling mediums.

We claim:

1. The process of pasteurizing liquids in containers which comprises transmitting said containers through a preheating zone, a pasteurizing zone, and a cooling zone, forcibly discharging sprays of preheating, pasteurizing and cooling liquids under pressure onto the containers as they pass through the respective preheating, pasteurizing and cooling zones, and causing forcibly discharged sprays of liquid at different temperatures to overlap between two of said zones to gradually change the temperature of the containers passing from one zone to another.

2. The process of pasteurizing liquids in containers which comprises transmitting said containers through a continuous field of overlapping flaring sprays of liquid, and maintaining successive portions of said continuous field of overlapping sprays at preheating, pasteurizing and cooling temperatures.

3. The process of pasteurizing liquids in traveling containers which comprises subjecting the traveling containers to successive sprays of heated liquid, while applying forcible mechanical pump pressure to a stream of the heated liquid, continuing the transmission of mechanical pump pressure from said stream of heated liquid to said sprays, and causing adjacent sprays to forcibly intersect while under the influence of the pump pressure, so as to produce forcible impacts at the intersections.

4. The process of pasteurizing liquids in traveling containers which comprises subjecting the traveling containers to successive diverging, flaring sprays of heated liquid, while applying forcible mechanical pump pressure to a stream of the heated liquid, continuing the transmission of mechanical pump pressure from said stream of heated liquid through said sprays to the containers, and causing adjacent flaring sprays to forcibly intersect and overlap while under the influence of the pump pressure, so as to produce forcible impacts at the intersections.

5. The process of pasteurizing liquids in containers which comprises transmitting the containers through a pasteurizing zone, subjecting the traveling containers to successive diverging, flaring sprays of heated liquid to heat the containers and their contents to a pasteurizing temperature and maintain the same at said pasteurizing temperature until the pasteurizing operation is completed, applying forcible mechanical pump pressure to a stream of the heated liquid, continuing the transmission of mechanical pump pressure from said stream of heated liquid through said sprays to the containers, and causing adjacent flaring sprays to forcibly intersect and overlap while under the influence of the pump pressure, so as to produce forcible impacts at the intersections, the areas of said forcible intersections and the resultant impacts being distributed throughout the pasteurizing zone, so as to produce and maintain an approximately uniform pasteurizing condition throughout said pasteurizing zone.

6. The method of pasteurizing liquids in containers which comprises transmitting said containers and their contents through a pasteurizing zone, maintaining numerous diverging, overlapping, flaring sprays of pasteurizing liquid in said pasteurizing zone, each container being moved toward and then away from successive flaring syrays, simultaneously projecting each of said flaring sprays onto a plurality of the traveling containers in said pasteurizing zone, and subjecting each of the traveling containers to a simultaneous cooperative forcible action of a plurality of the flaring sprays.

7. The method of pasteurizing liquids in containers which comprises transmitting said containers and their contents through a pasteurizing zone, maintaining numerous diverging, overlapping flaring sprays of pasteurizing liquid in said pasteurizing zone, each container being moved toward and then away from successive flaring sprays, simultaneously projecting each of said flaring sprays onto a plurality of the traveling containers in said pasteurizing zone, subjecting each of the traveling containers to a simultaneous cooperative forcible action of a plurality of the flaring sprays, forcibly discharging a portion of a flaring spray toward one side of a traveling container as said container moves into the spray, and thereafter projecting another portion of the same flaring spray toward another area of the same container as the container moves away from the axis of the flaring spray.

8. The method of pasteurizing liquids in containers which comprises transmitting said containers and their contents through a pasteurizing zone, maintaining numerous diverging flaring sprays of pasteurizing liquid in said pasteurizing zone, each container being moved toward and then away from successive flaring sprays, simultaneously projecting each of said flaring sprays onto a plurality of the traveling containers in said pasteurizing zone, subjecting each of the traveling containers to a simultaneous cooperative forcible action of a plurality of the flaring sprays, forcibly discharging a portion of a flaring spray toward one side of a traveling container as said container moves into the spray, thereafter projecting another portion of the same flaring spray toward another area of the same container as the container moves away from the axis of the flaring spray, and causing adjacent diverging, flaring sprays to forcibly intersect and overlap in said pasteurizing zone, the areas of said forcible intersections and the resultant impacts being distributed throughout the pasteurizing zone, so as to produce and maintain an approximately uniform pasteurizing condition throughout said pasteurizing zone.

9. The method of pasteurizing liquids in containers which comprises producing a continual stream of the containers and their contents on an approximately horizontal support to form a crowded mass of the containers on said support, transmitting the approximately horizontal mass of containers through a preheating zone, a pasteurizing zone and a cooling zone, maintaining continuous fields of diverging, overlapping, flaring sprays of preheating, pasteurizing and cooling liquids in the respective zones, said diverging flaring sprays being discharged at elevations higher than the upper ends of the containers, so as to provide a clear passage for the mass of containers, said containers being moved toward and then away from successive flaring sprays, simultaneously projecting each of said flaring sprays onto a plurality of the traveling containers, subjecting each traveling container to the forcible action of a plurality of the flaring sprays, causing each diverging flaring spray to repeatedly act upon a traveling container at different points in the travel of the container, by discharging a portion of said spray onto one side of the traveling container as said container moves toward the axis of the diverging, flaring spray and thereafter projecting another portion of the same spray onto the opposite side of the container as said container moves away from said axis of the diverging, flaring spray, and causing adjacent diverging, flaring sprays to forcibly intersect and overlap in a continuous field at points directly between separated upper portions of adjacent containers, the areas of said forcible intersections being distributed throughout said continuous field, so as to include adjacent flaring sprays having their respective axes at points ahead of and at the rear of the last mentioned adjacent containers.

JAMES L. HEROLD.
WILLIAM J. NEKOLA.
FREDERICK W. WEHMILLER.